United States Patent

[11] 3,583,764

| [72] | Inventors | Thomas E. Lohr<br>Warren;<br>Robert L. Stephenson, Sterling Heights, Mich. |
|---|---|---|
| [21] | Appl. No. | 830,820 |
| [22] | Filed | June 5, 1969 |
| [45] | Patented | June 8, 1971 |
| [73] | Assignee | Allied Chemical Corporation<br>New York, N.Y. |

[54] SAFETY SEAT AND BELT SYSTEM
5 Claims, 5 Drawing Figs.

[52] U.S. Cl. .................................. 297/389, 280/150
[51] Int. Cl. .................................. B60n 1/06, B60r 21/10, A62h 35/00
[50] Field of Search .................................. 297/385, 386, 388, 389, 445, 455, 457; 298/423, 429; 296/63—66; 280/150SB

[56] References Cited
UNITED STATES PATENTS

| 3,219,387 | 11/1965 | Peters .......................... | 297/388 |
| 3,323,829 | 6/1967 | Liem ........................... | 296/65 |
| 3,325,213 | 6/1967 | Levy ........................... | 297/389 |
| 3,348,881 | 10/1967 | Weman ........................ | 297/388 |
| 3,442,529 | 5/1969 | Lewis et al. ................... | 297/388 |
| 3,464,751 | 9/1969 | Barecki et al. ................. | 297/386X |

*Primary Examiner*—Casmir A. Nunberg
*Attorney*—Hauke, Krass, Gifford & Patalidis ABSTRACT: A vehicle bucket seat having a safety belt assembly in which shoulder and lap belts are mounted on a one-piece seat frame. The shoulder belt extends from a housing mounted to the seat structure between the frame and the cushion and in one embodiment the lap belts are mounted to the adjusting mechanism while in another embodiment the ends of the lap belt extend from the cushion seat.

INVENTOR
THOMAS E. LOHR
ROBERT L. STEPHENSON
BY
Hauke Knaus Gifford & Patalidis
Attorneys INVENTOR
THOMAS E. LOHR
ROBERT L. STEPHENSON
BY
Hauke Knaus Gifford & Patalidio
Attorneys

SAFETY SEAT AND BELT SYSTEM

BACKGROUND OF THE INVENTION

1. Field of the Invention

This invention relates to vehicle safety seat belt systems, and more specifically to such a system in which a shoulder belt and a lap belt are each connected to retractors that are mounted on a one-piece seat frame.

2. Description of the Prior Art

Vehicle safety seat belt systems usually comprise a lap belt and a shoulder belt, each of which is connected to the vehicle frame adjacent the seat. Although the advantages of connecting the seat belts directly to the seat frame are well known, it is believed that such an arrangement has not been commercially available for several reasons. One reason is that the forward seats in most vehicles are mounted on adjusters that allow the user to adjust the position of his seat with respect to the vehicle. Generally, such adjusters do not have sufficient strength to accommodate the substantial inertial forces that are applied on the seat belts by the user when the vehicle experiences a sudden impact.

Another reason is that in many vehicles the seat back must fold forward to provide access to the rear of the passenger compartment. Although latching means have been provided for locking the seat back in its upright position, such devices have not been designed to accommodate a force of the magnitude that may be applied to a shoulder belt.

SUMMARY OF THE INVENTION

The broad purpose of the present invention is to provide a vehicle seat and belt assembly in which the lap and shoulder belt components are connected directly to the seat frame to allow the seat and the belts to be adjustable together with respect to the vehicle. The preferred seat has a panel bent to form a one-piece frame which includes a base that is supported generally parallel to the vehicle floor, and an upright back. The frame base is mounted on an adjuster that allows the seat to be horizontally adjusted as well as tilted by the user to a suitable position.

In one embodiment, a retractor for a lap belt is mounted adjacent one lateral side of the seat frame base. A pair of lap belts are connected to opposite sides of the frame, the longer belt being connected to the retractor. Buckle hardware carried by the two belts provides means for connecting them together to form a lap restraint. A second retractor is also mounted on the seat base adjacent an elongated housing that extends along the side of the seat frame from the forward edge of the base toward the upper edge of the back. The upper end of the housing has an opening for passage of a shoulder belt which is connected to the second retractor. The shoulder belt may be extended from the housing and connected to the lap belt hardware to form a diagonal restraining element, or when not in use, retracted into the housing. Since the belts are connected to the seat and not to the vehicle, the seat can be adjusted without disturbing the adjusted length of the belts.

In another embodiment, the ends of the lap belts extend from within the seat cushion.

Still further advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
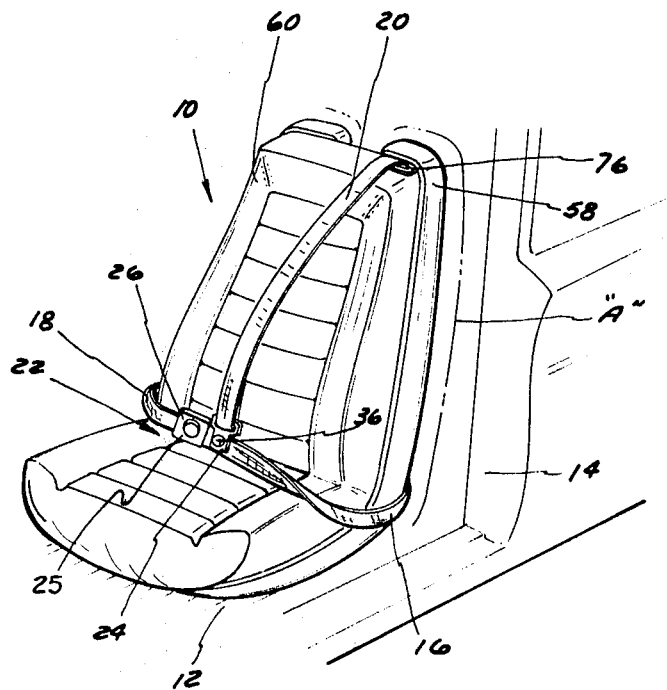
FIG. 1 is a front perspective view of a seat and belt assembly illustrating the preferred embodiment of the invention.
Figure 2:
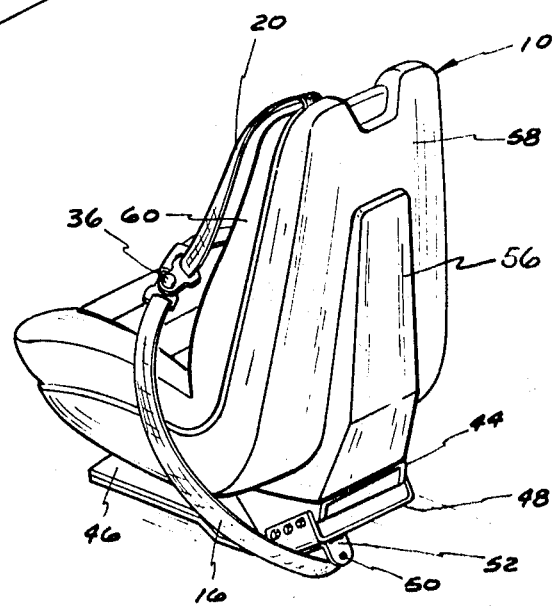
FIG. 2 is an oblique, rear view of the preferred assembly as seen from the left side of the seat.
Figure 3:
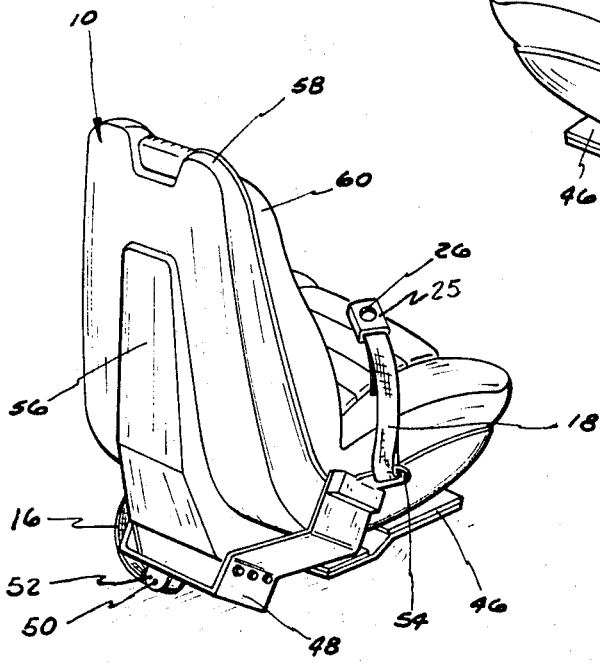
FIG. 3. is a view similar to FIG. 2, but showing the right side of the preferred seat assembly.

Referring to the drawings, FIGS. 1 to 3 illustrate a preferred seat 10 mounted on the floor panel 12 of a vehicle 14. A lap belt 16 has one end connected to the left side of the seat 10 and its opposite end releasably connected to a lap belt 18. The lap belt 18 is connected to the right side of the seat 10. A shoulder belt 20 has one end connected to the seat 10 and its other end releasably connected to the lap belts 16 and 18 by buckle hardware generally indicated at 22 to form a diagonal shoulder restraint.

Buckle hardware 22 includes a tongue 24 carried on the end of the belt 16. A buckle 25, carried on the end of the belt 18, has an opening for receiving tongue 24, and pushbutton-operated latch means 26 which are received by a tongue opening 28 to form a releasable connection between the two lap belts. A plate 30, carried by the shoulder belt 20, has an opening 32 for receiving a stud 36 mounted on the tongue plate 24 to form a connection between the shoulder belt and the lap belts 16 and 18. The buckle hardware 22 is such that the user can connect the lap belt 16 and 18 together to form a lap restraint either with or without a shoulder restraint. However, a shoulder restraint cannot be formed unless both lap belts are connected together.

Figure 4:
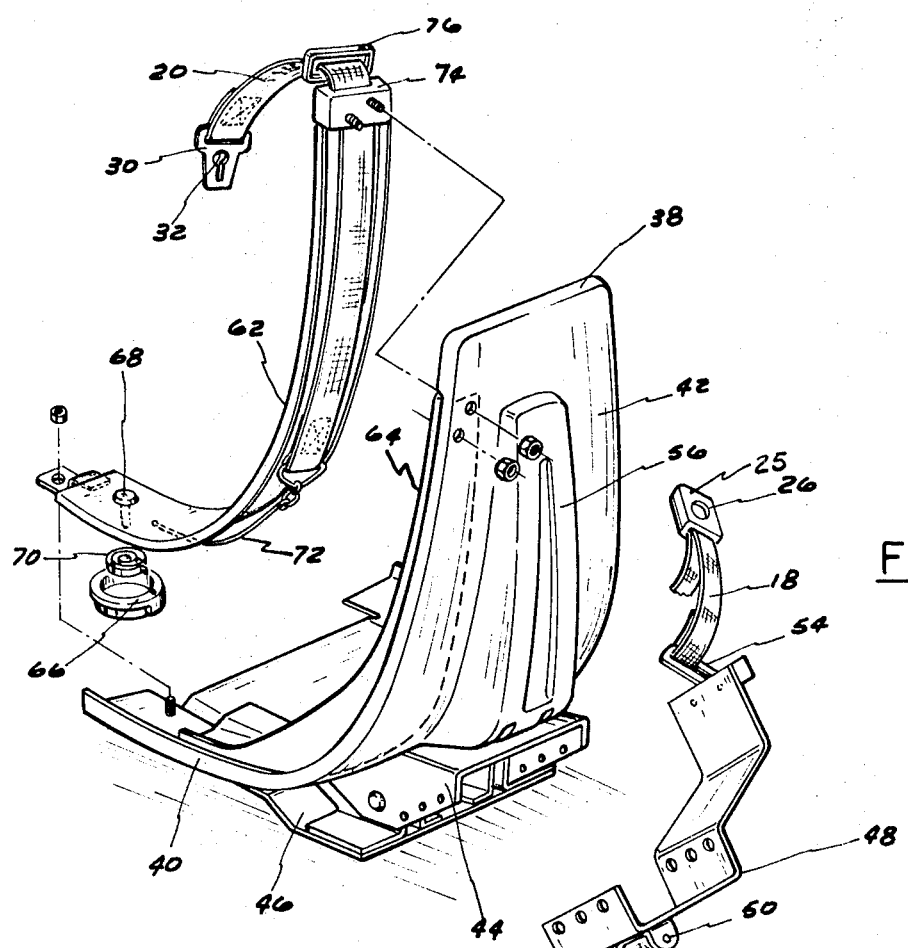
FIG. 4 is an exploded view of the preferred seat assembly with portions removed for descriptive purposes.

Referring to FIG. 4, the seat 10 has a frame 38 formed of a one-piece panel which is bent to form a base 40 and a back 42. A bracket 44, attached to the lower side of the base 40, is connected by adjusting mechanism (not shown) to a support 46 which is attached to the floor panel 12. The adjusting mechanism which forms the basis for a copending U.S. Pat. application Ser. No (ACH-105-C) and therefore which will not be described in detail herein allows the seat frame 38 to be horizontally adjusted as well as tilted with respect to a position "A", illustrated in FIG. 1 in phantom, and then locked in its adjusted position.

A support 48 is attached to bracket 44. A spring-biased retractor reel 50 is journaled on a generally U-shaped support 52 which is mounted adjacent the left side of the support 48. The lap belt 16 is connected to the reel 50 so as to be biased toward a retracted position in which it is wound on a reel 50. The user forms a connection between the belts 16 and 18 by extending the belt 16 from its retracted position and then coupling the tonque 24 to the buckle 25.

A connector 54, attached to support 48 adjacent the right side of the seat 10, provides means for connecting the belt 18 to the seat frame base 40. The belt 18 is relatively short with respect to the belt 16. Therefore, when the shoulder belt 20 is connected to the tongue 24, it is disposed diagonally across the front of the seat back 42.

A rib 56 is attached to the back 42 of the frame 38 to reinforce the frame 38 between the base 40 and the back 42. A cover 58 (FIGS. 1—3) is mounted on the back and lower sides of frame 38 to form a decorative housing. A cushion 60 is mounted to the front of the frame 38 and forms both the seat cushion and the back cushion for the seat.

Now referring to FIG. 4, a pair of elongated housing members 62 and 64 are mounted along the front left edge of the frame 38. A reel 66 is journaled on a pin 68 which is mounted on base 40 adjacent the lower end of the housing members 62 and 64. A spiral-retracting spring 70 is connected between the reel 66 and the anchor pin 68 to bias the reel toward rotation in a retracting direction, but to allow the reel to be rotated in the opposite direction. A wire 72 connects the lower end of the shoulder belt 20 to the reel 66 so that as the reel is rotated in its retracting direction, it retracts the belt to a position between the housing members 62 and 64 and parallel to the contour of the frame 38.

A support 74 at the upper end of housing members 62 and 64 has an opening for passing the belt toward its retracted position. A ring 76, mounted on the top of cushion 60, guides the belt 20 as it is extended and retracted by the user.

To connect the shoulder belt 20 to buckle hardware 22, the user extends the belt from its retracted position against the bias of the spring 70. When the user disconnects the belt 20 from hardware 22, the spring 70 urges the belt 20 toward its retracted position between the housing members 62 and 64. The plate 30 is shaped such that it will not pass through the ring 76 thereby providing a handle for the user to extend the belt.

Figure 5:
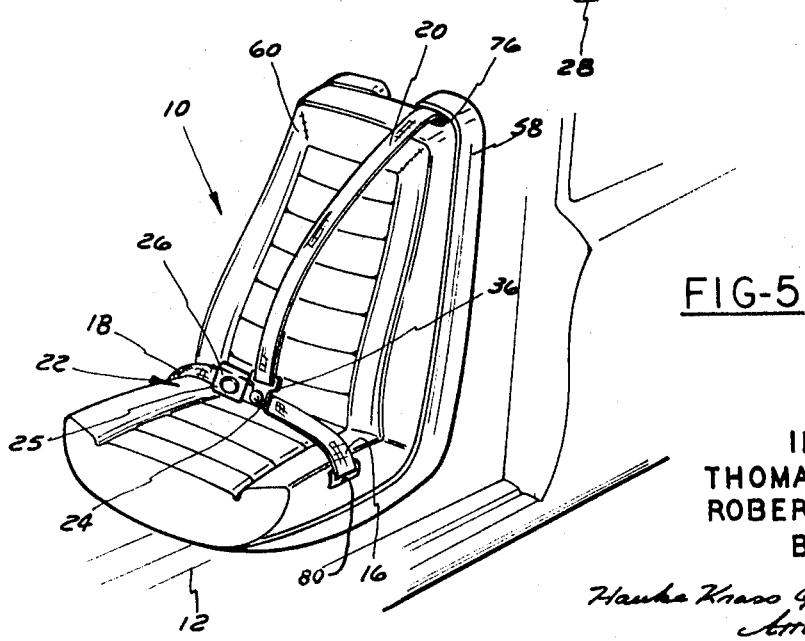
FIG. 5 is a view similar to FIG. 1, but illustrates a preferred embodiment in which the ends of the lap belt extend from within the seat cushion.

FIG. 5 discloses an arrangement similar to that shown in FIGS. 1—4 except that the lap belts 16 and 18 are connected to the frame 38 beneath the cushion 60 and extend through openings 80 provided in the cushion.

In summary, it is to be understood that we have described a seat and safety belt system in which the two lap belts 16 and 18 and the shoulder belt 20 are connected directly to the one-piece frame 38, and have hardware for connecting the three belts together to form a closed system. Furthermore, both the lap belt 16 and shoulder belt 20 are connected to retractors mounted adjacent the same side of the seat frame, and have hardware for providing connections to the opposite side of the seat frame to form a restraining system.

Having described our invention, we claim:

1. In a vehicle having a floor, a seat assembly comprising:
   a panel shaped to form a one-piece seat frame having a base and a back;
   structure mounted on the floor of the vehicle, and attached to the seat frame to support the base generally parallel to the floor and the back generally perpendicular to the floor;
   a retractor reel mounted on the frame base for rotation in first and second directions;
   a bias member connected to the reel to urge it toward its first direction;
   a housing mounted on the frame, said housing having an opening on the frame back above the frame base;
   a belt connected to the reel for passage through said opening toward an extended position as the reel is rotated in its second direction, or toward a retracted position in the housing as the reel is rotated in its first direction; and
   connecting means for releasably connecting the belt to the frame base when the belt is in its extended position.

2. A seat assembly as defined in claim 1, in which the housing opening is adjacent one lateral side of the frame back, and said connecting means is adapted for connecting the belt to the opposite lateral side of the frame base to form a diagonal restraining element.

3. The seat assembly as defined in claim 1 in which said housing opening is adjacent one lateral side of the back of said seat frame and including a lap belt connected to the seat on the same lateral side of the seat frame as said housing opening, said connecting means forming a connection between said seat belt and said lap belt.

4. A seat assembly as defined in claim 1 comprising a second retractor mounted on said seat frame and a lap belt connected to said second retractor to be retracted toward the base of said seat frame as said second retractor is moved in its retracting motion, said connecting means forming a connection between said seat belt and said lap belt.

5. A seat assembly as defined in claim 1 including a seat cushion disposed over said seat frame and in which said connecting means comprises a lap belt extending from said cushion and adapted for connection to said seat belt.